United States Patent [19]
Smith

[11] Patent Number: 5,035,313
[45] Date of Patent: Jul. 30, 1991

[54] TELESCOPIC CHUTE FOR A MIXER TRUCK

[76] Inventor: Felesta Smith, 3963 39th Ave., Sacramento, Calif. 95824

[21] Appl. No.: 519,935

[22] Filed: May 7, 1990

[51] Int. Cl.⁵ .............................................. B65G 11/14
[52] U.S. Cl. ......................................... 193/2 B; 193/5; 193/6; 193/16; 193/25 A; 193/25 C
[58] Field of Search .................. 193/2 R, 2 A, 2 B, 5, 193/6, 16, 25 R, 25 A, 25 C

[56] References Cited

U.S. PATENT DOCUMENTS

| | | | |
|---|---|---|---|
| 2,095,494 | 10/1937 | Dobbs | 193/6 |
| 2,968,382 | 1/1961 | Oury | |
| 3,157,262 | 11/1964 | Chapdelaine | |
| 3,334,872 | 8/1967 | Hansen et al. | |
| 3,774,741 | 11/1973 | Johnson | 193/6 X |
| 4,047,604 | 9/1977 | Daoust et al. | 193/16 X |
| 4,054,194 | 10/1977 | Davis | 193/2 R X |
| 4,529,660 | 7/1985 | Heim | 193/2 R X |
| 4,634,285 | 1/1987 | Newberry | 193/6 X |
| 4,919,249 | 4/1990 | Alexander | 193/6 |

FOREIGN PATENT DOCUMENTS 0638520 12/1978 U.S.S.R. ............................. 193/2 B

*Primary Examiner*—D. Glenn Dayoan

[57] ABSTRACT

A dispensing chute comprised of a plurality of slidable telescopically fitted sections for conveying materials from the discharge end of a drum of a mixer truck to a point remote from the vehicle. The chute sections are structured of interlocking open metal frames having replaceable plastic liners removably affixed in the interior of each frame. Dovetail shaped guide and support tracks connecting one chute section to another are also individually removable from the chute section. One end of each chute section has removable flexible wipers which scrape clean the surface of the next chute during the retraction mode. Retraction and extension of the chute sections relative to each other is power operated through the use of attached hydraulic rams controllable through switching to actuate electric solenoid valves. The outer most chute section has an attached remote control switch station to allow controllable powered movement of the telescopic chute in a wide range of movements by the operator from the dispensing end of the chute.

15 Claims, 8 Drawing Sheets

TELESCOPIC CHUTE FOR A MIXER TRUCK

BACKGROUND OF THE INVENTION

1. Field of the Invention

This invention relates to telescopic chutes used for directing and dispensing aggregate and cementitious materials from a mixer truck to a point remote from the truck. The telescopic chute of this invention is adapted for use on mixer trucks of the type which normally mix and transport concrete.

2. Description of the Prior Art

The majority of chutes now in use for directing and dispensing ready mix concrete and the like from mixer trucks are comprised of several separate trough-like sections which are manually hooked together at the beginning of each job to form one extended chute. Once assembled, the chutes receive the concrete from the dispensing end of the drum of the mixer truck, and transport the flowable concrete using gravity feed a significant distance from the mixer truck. Extended chutes eliminate the need to manually transport the concrete with shovels and or wheelbarrows. The hook-together chute sections are not only heavy, cumbersome, and somewhat dangerous due to the weight to assemble and disassemble, but require storage space on the exterior of the mixer truck after the job is completed.

In order to solve some of the problems associated with separate hook-together chutes, telescopic chutes for dispensing concrete from a truck have been tried in the past. Telescopic chutes are generally comprised of a plurality of overlapping trough-like sections which can be retracted into a compact form for transportation on the mixer truck, and extended for dispensing remote of the truck. Although telescopic chutes for dispensing aggregate mixtures from mixer trucks are not new to the field, their use has not gained any appreciable popularity up to the present.

There exists problems in the past art telescopic chutes which have made their use inconvenient and excessively expensive for profitable use. The major problem associated with past art telescopic chute structures for mixer trucks has been the cost of maintenance over an extended period of time. Aggregate materials containing rock and sand are extremely abrasive, and the chemicals and water mixed with the rock to form concrete are corrosive to chutes, particularly chutes made of metal. Abrasion and corrosion of these metal chutes significantly reduces their functional lifespan. Often a metal chute will have a lifespan as short as eighteen months. Abrasion from the rock and sand also greatly reduces the functional life of sliding interlocks and guide tracks typically used on telescopic chute structures. Telescopic chute structures are quite expensive to build or purchase when compared to simpler more conventional hook-together chute structures, and when the sections of the telescopic chute are worn, it becomes prohibitively expensive, or not cost effective for most companies to replace the chute sections, particularly when replacement may be necessary every 18 months. The high maintenance expense associated with telescopic chutes is recognized by those who have attempted to use this type of structure in the past on mixer trucks In a patent search performed at the U.S. Patent and Trademark Office, the following past art documents were determined to teach devices somewhat similar to my improved telescopic chute.

A U.S. patent issued to J. F. Oury on Jan. 17, 1961, U.S. Pat. No. 2,968,382, teaches a telescopic chute comprised of smaller individual chute sections which apparently must be entirely replaced when component sections become worn or damaged, primarily the trough section of the chute. Controls for manipulating the extension and angle of the chute are located at the rear of the truck where it may be difficult to see the actual dispensing of the concrete at the distal end of the chute.

L. P. Chapdelaine was granted U.S. Pat. No. 3,157,262, on Nov. 17, 1964, for a telescopic chute operating on a system of cables and pulleys. This device does not appear to include self-cleaning structuring of the chutes and would more than likely experience extreme wear and tear, requiring replacement of entire chute sections.

The U.S. Patent granted to N. S. Hansen on Aug. 8, 1967, U.S. Pat. No. 3,334,872, shows a mixer truck having a front mounted discharge end and chute where the driver can better see and control the distribution of the concrete. Although Hansen mentions controls for the distribution of the concrete being operated from the cab of the vehicle or other convenient location, he does not anticipate the use of telescopic chutes. No mention is made of individual detachable components of the chute providing for inexpensive replacement of worn sections.

Other past art patents examined in the search which taught telescopic chute structures were considered indicative of telescopic chutes, and having similar problems associated therewith as previously presented in the Oury and Chapdelaine devices.

Also typical of dispensing chutes is the location of the control levers or switches for manipulating the position of the chutes, whether of the telescopic type or more conventional hook-together type chute. Typically, controls are permanently located in fixed locations on the truck. The truck does not seem to be the ideal position for controlling movement of the chute when the dispensing end of the chute may be twenty feet away, and already has a person standing there attempting to monitor the discharge from the chute.

None of the previously mentioned past art devices described power actuated telescopic chutes having replaceable liners. Some vaguely suggest replacement of the entire individual sections of the chute, and not specific components of the chute sections which wear out more quickly than others, such as the interior of the trough which contacts the concrete, or the guide and support track components.

SUMMARY OF THE INVENTION

I have provided a telescopic chute for receiving and conveying flowable aggregate or cementitious materials and the like from the discharge end of the drum of a mixer truck for dispensing the materials at a point remote from the vehicle. My chute is generally comprised of a plurality of metal, interlocking open chute frames telescopically fitted together. Each of the metal chute frames are fitted with a readily replaceable plastic lining bolted to the interior of the open frame to serve as the bottom and sides of the chute section. The plastic linings prove easier to clean and are much less costly to replace than the entire chute section. The liners, when made of a slick plastic, have also been found to be significantly more durable when compared to metal chutes before being worn to the point of having to be replaced. The plastic liners are also not subject to corrosion.

Dovetail shaped guide rails and support tracks affixed to each open frame section of my chute are also readily removable for simple, quick and less costly repairs. The ends of each chute section also have removable flexible wipers which scrape the surface of the next chute section when retracted, wiping off the excess concrete for easier final cleaning of the chute with a water hose.

Retraction and extension of my chute sections relative to each other is power operated through the use of attached hydraulic rams controllable through switching to actuate electric solenoid valves which control the flow of the hydraulic fluid. The outer most chute section, or the chute section at the distal end of the chute has an attached remote control switch station to allow controllable powered movement of the chute inward and outward, laterally of the truck on a vertical axis, and up and down on a horizontal axis to change the slope of the chute. The movements are controllable by either the operator at the truck where a set of control switches are mounted, or by the operator from the dispensing end of the chute by the set of control switches on the chute which are wire in parallel with the switches mounted on the mixer truck. However, one set of control switches on the distal end of the chute without the set on the truck is also quite feasible since the switches on the chute are always within reach.

Since my chute directs concrete using gravity, the chute must be at a slight angle when dispensing. If the chute is not sufficiently sloped, the concrete will not flow properly. The height of the receiving end of the chute is restricted by the height of the dispensing opening of the drum of the truck, thus limiting the maximum distance the chute can extend away from the truck and still have sufficient slope. In order to allow my chute to extend a maximum distance and still have the concrete flow through the chute at a reasonable rate, I have attached a vibrator to my chute to vibrate and cause flowing of the concrete when there is very little slope. Although my telescopic chute is shown in the drawings attached to the back end of a mixer truck which dispenses from the back end, my chute structure will also function well when mounted on the less common type of mixer truck which dispenses from the front end of the truck over the cab.

Therefore, it is a primary object of my invention to provide an improved telescopic chute structure for mounting onto a mixer truck adjacent the dispensing opening of the drum of the truck, with the chute being cost effective over an extended period of time due to having readily replaceable individual parts.

Another object of my invention is to provide the above in a telescopic chute structured of a plurality of open metal chute frames lined with readily replaceable protective liners.

Another object of my invention is to provide the above using plastic liners within the open metal chute frames.

Another object of my invention is to provide the above using readily replaceable interlocking guide rails and support tracks bolted to the chute frames, preferably being in a dovetail mortise and tenon shaped guide rail and support track.

Another object of my invention is to provide the above in a telescopic chute which is power actuated in a wide range of movements.

Another object of my invention is to provide the above in a telescopic chute having a remote control switching station affixed to the dispensing end of the chute, enabling powered manipulation of the position of the chute by the operator from the dispensing end of the extended chute.

Other objects of my invention will become apparent with examination of the remaining specification and the accompanying numbered drawings.

DESCRIPTION OF THE PREFERRED EMBODIMENT

Figure 1:
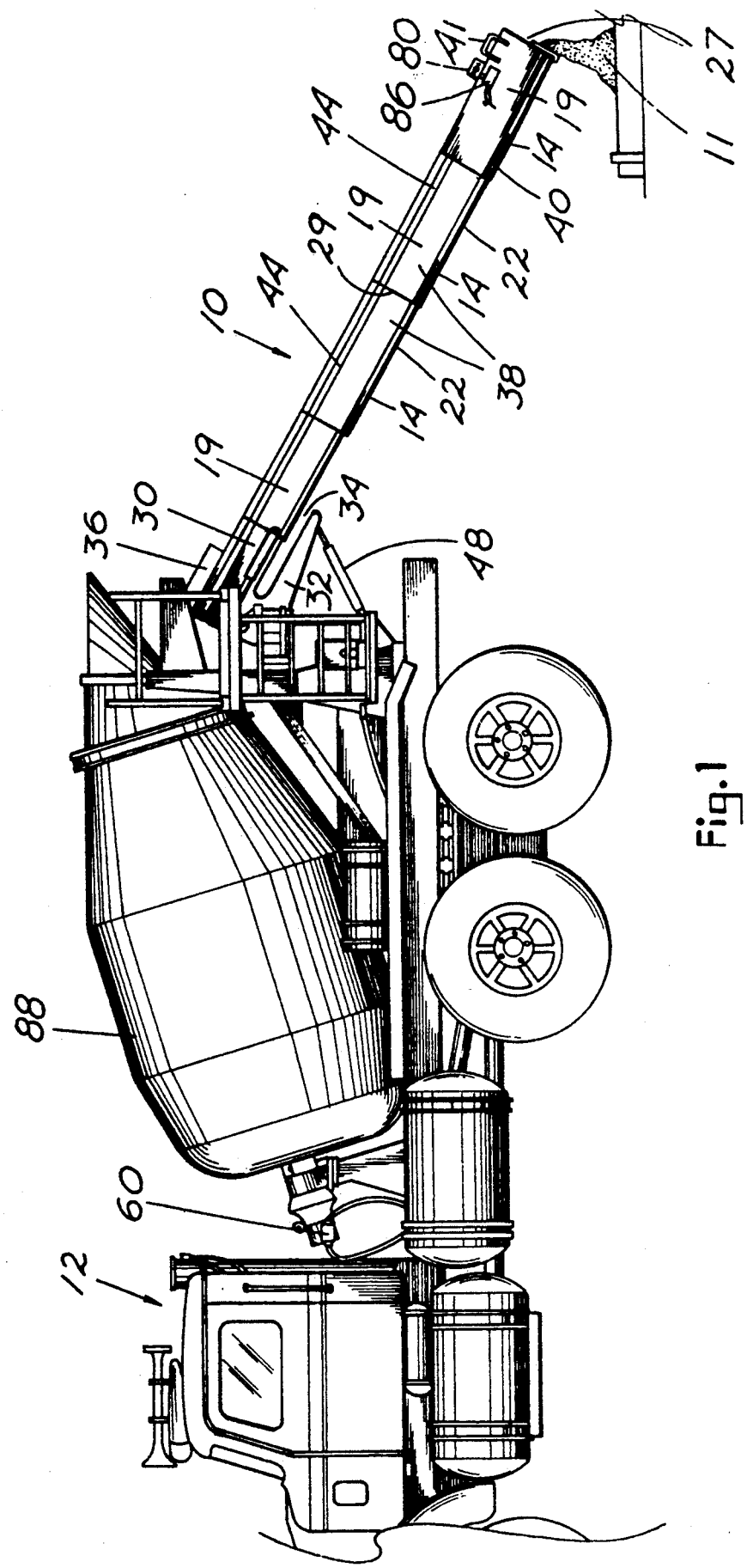
FIG. 1 illustrates my telescopic chute structure in the extended position attached to a mixer truck adjacent the discharge opening of the drum of the truck. The mixer truck in this view happens to be of the type which discharges from the rear of the truck rather than the front.
Figure 2:
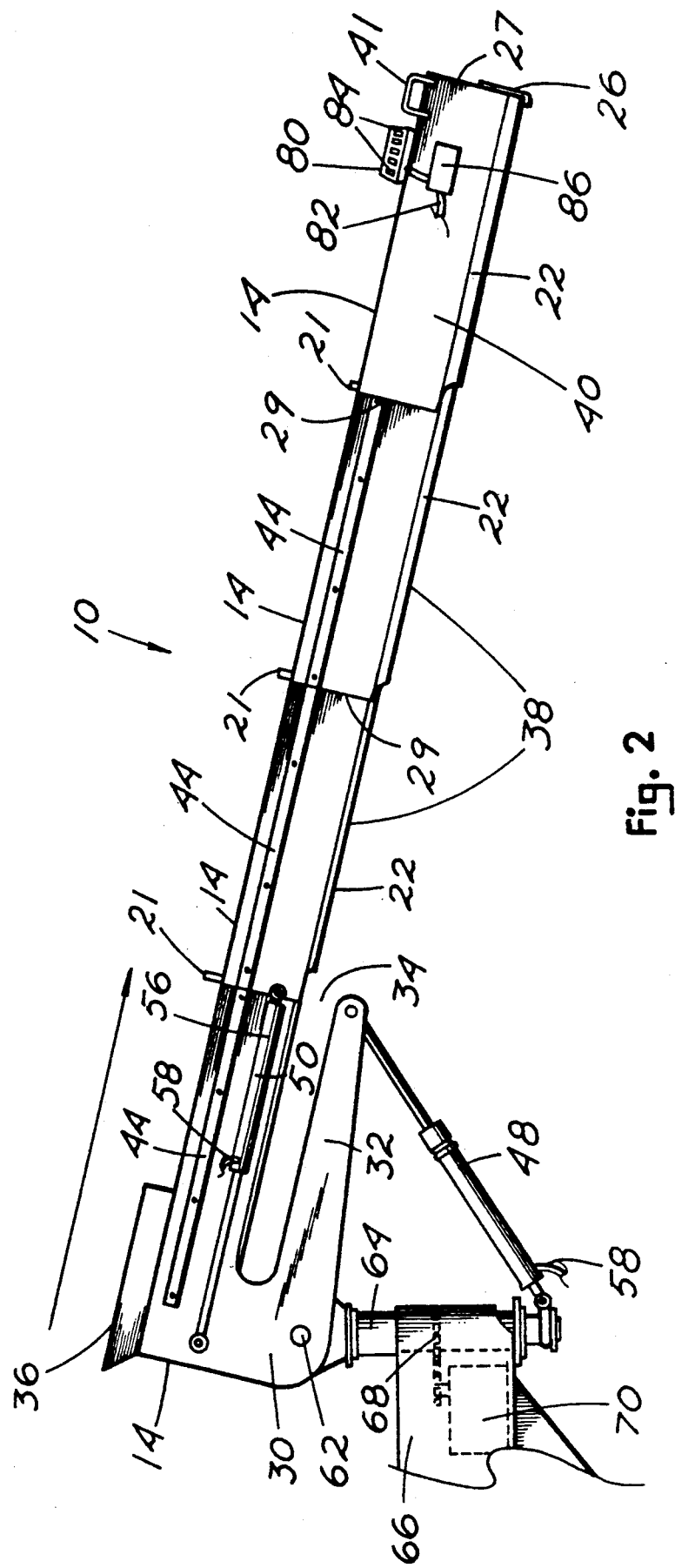
FIG. 2 is a left side view of my telescopic chute in the extended position. A mounting structure in the far left of the drawing is shown to illustrate a mount structure suitable in most cases for attaching the chute to a mixer truck.
Figure 3:
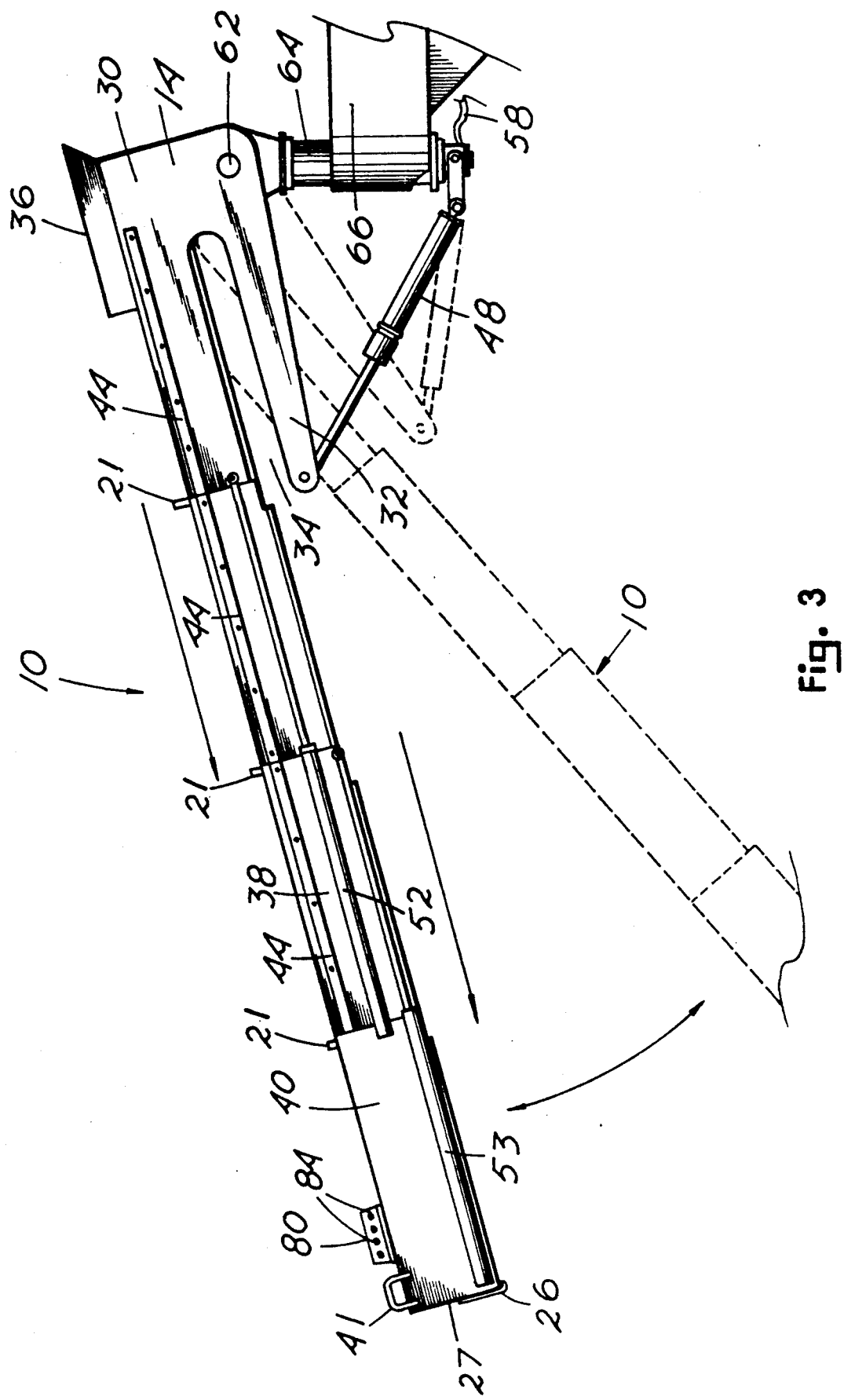
FIG. 3 is a right side view of my telescopic chute in the extended position at a slight angle. Shown using dotted lines is the chute positioned at a steeper angle.
Figure 4:
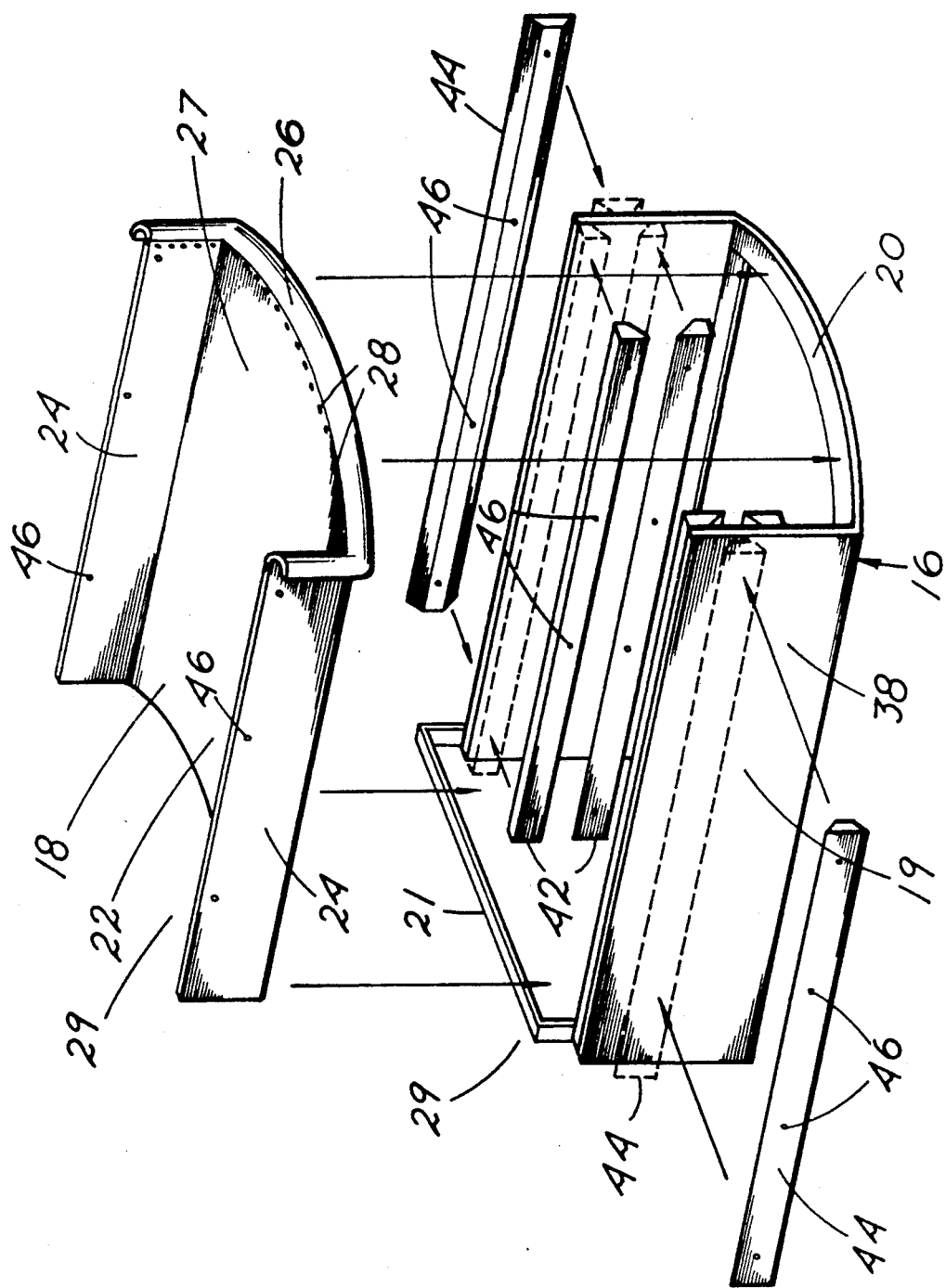
FIG. 4 is an exploded view of one chute section of the immediate invention. A multiple of similarly structured chute sections are used to form the telescopic chute shown in the first three views.
Figure 9:
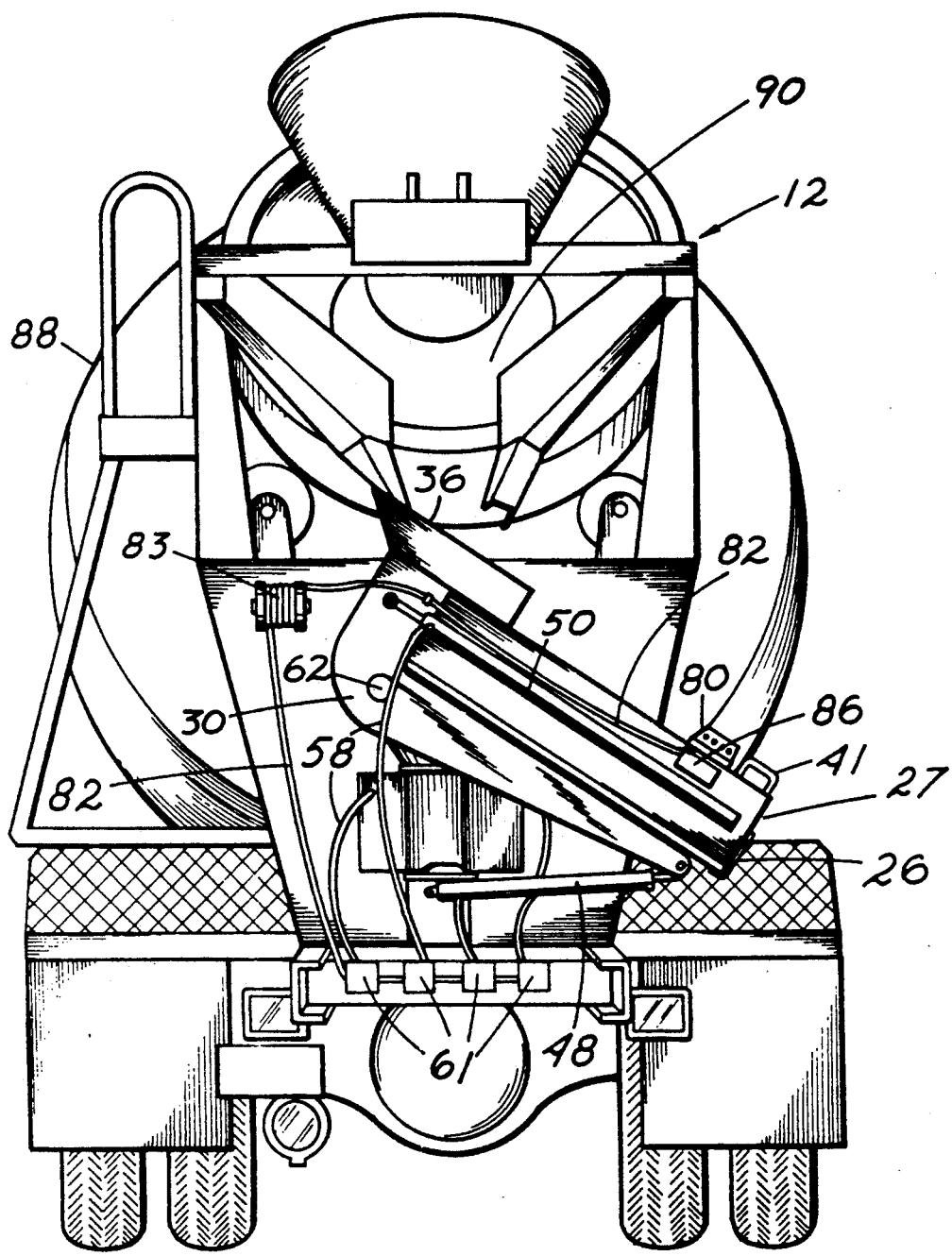
FIG. 9 shows my telescopic chute attached to the back of a mixer truck in the retracted or fully nested state, and positioned to one side of the rear of the truck, having been pivoted about the vertical axis of the truck attachment structure into a position for transporting.

Referring now to the drawings where my improved telescopic chute 10 is shown in use dispensing concrete 11. Telescopic chute 10 is affixed to a transit concrete mixer truck 12. Telescopic chute 10 is comprised of several separate nestable telescoping chute sections 14, shown in FIG. 1 with five chute sections 14 to exemplify that any number of chute sections 14 may be used, and in FIGS. 2 and 3 with four chute sections 14. The number of chute sections 14 can vary as this does not directly effect the operation of telescopic chute 10. Each chute section 14 is basically comprised of an elongated rectangular steel chute frame 16 which has an opened top, an opened bottom, and two oppositely disposed opened ends. Chute frames 16 are each of a generally equal length to each other, but are sized in width to fit one chute frame 16 within another in a nested position Each chute frame 16 consists of two parallel flat rectangular metal panels which form vertical chute sidewalls 19, with at least two bottom transverse brace members 20 connecting the lower corners of both chute sidewalls 19. Transverse brace members 20 are elongated metal bars, slightly arcuate in shape, forming a downward arch as shown in FIG. 4. Chute sidewalls 19 are also secured with at least one additional cross member 21, which is a straight elongated metal bar welded to two upper corners of each chute frame 16. Cross members 21 are staggered in height relative to each other to provide clearance of one member 21 over the other members 21 attached to the other chute sections 14 as shown best in FIG. 6. The height staggering of cross members 21 allows unobstructed extension and retraction of the chute sections 14 from a fully nested position as shown in FIG. 9, to a partially nested position as shown in FIG. 1, 2, and 3, where, although the chute 10 is in the fully extended position, the chute members 14 are still overlapping each other at the ends slightly. Transverse brace members 20 and cross members 21 help to add strength and rigidity to chute frames 16, and brace members 20 support the bottoms of chute liners 18.

Each chute frame 16 is affixed with a removable interior bottom plastic chute liner 18. Chute liner 18, best shown in FIG. 4, is comprised of a relatively thin sheet of durable and slick thermoplastic material having a bowed bottom panel 22 and two vertical side panels 24. ABS or polyethylene are just two of many types of plastic which are suitable materials for manufacturing chute liners 18. Chute liner 18 is sized for removable attachment to chute sidewalls 19 and bottom brace members 20, covering both interior sides and open bottom surface of chute frame 16. The protective covering provided by liners 18 prevents concrete from flowing against any part of the frames 16. The arcuate shape of plastic liner 18 and brace members 20 provides chute sections 14 with a trough-like structure open on the top and at the two oppositely disposed ends to allow materials to flow lengthwise through chute sections 14.

Removably affixed to one end of chute liner 18 is flexible scraper 26, best shown in FIG. 4. The end of chute section 14 affixed with scraper 26 will also hereinafter be referred to as discharge end 27 with the opposite opened end being simply referred to as back end 29. Scraper 26 is a narrow curved flexible plastic flange extending outward from the edges of one end of liner 18, curving sharply downward and backward towards the opposite direction. Scraper 26 is removably affixed with flush mounted bolts 28 to the outer edges of liner 18, and can be easily replaced when worn. Liner 18 is also removably affixed to chute frame 16 with flush mounted bolts 28 for easy replacement when needed. The function of plastic lining 18 and scraper 26 will be explained further in the specification.

Figure 6:
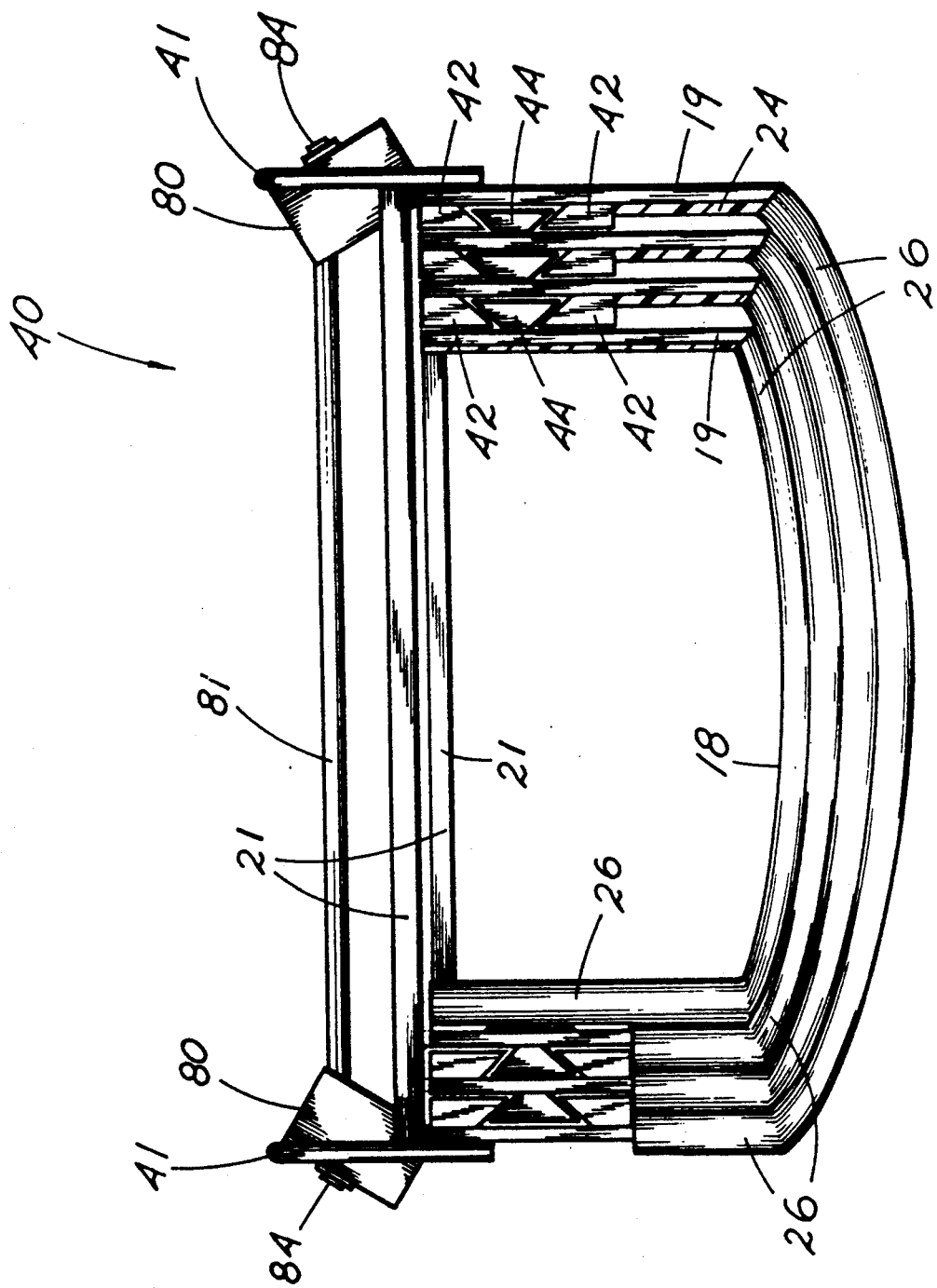
FIG. 6 is a direct end view of my assembled telescopic chute. Scraping panels are shown removably attached to the ends of each chute section. The scrapers on the right side, below the dovetail shaped guide tracks are shown sectioned to illustrate the placement of the liners in the metal frames.

Each chute section 14 increases in width and height further from truck 12, with the largest chute section 14 comprising the distal end of the assembled chute 10, see FIG. 2 and 6. It should be noted that the chute 10 could also be structured within the scope of the invention with the largest chute section 14 adjacent the truck 12, with the chute sections 14 becoming progressively smaller toward the dispensing end of the chute 10. In addition to this graduated size differential of each chute section 14, there are also three distinct chute section 14 structures.

The first or smallest chute section 14 adjacent truck 12 is referred to as support chute 30. Support chute 30 is slightly modified over the remaining chute sections 14 with two parallel metal L-shaped support brackets 32 affixed one to each bottom edge of chute sidewalls 19, on the attachment end or end opposite discharge end 27. Support brackets 32 extend downward and forward as shown in FIG. 2 and 3. The elongated reserve space 34 created between support bracket 32 and the bottom edge of chute sidewall 19 allows for the telescopic, fully nested storage of the remaining assembled chute sections 14. Support chute 30 is also affixed on the upper opened surface with a receiver funnel 36, which will be explained later on in more detail. The remaining chute sections 14 include two or more mid-section chutes 38, and one distal end or dispensing chute 40. Dispensing chute 40 is also affixed with handles 41 for manual gripping and positioning, best shown in FIG. 5.

Figure 7:
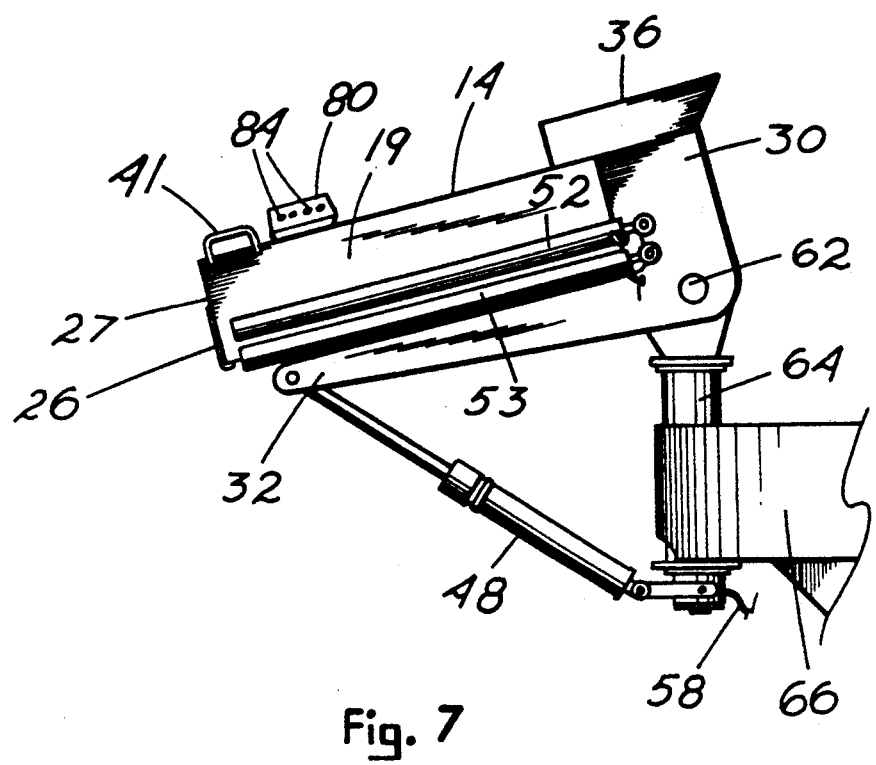
FIG. 7 is a right side view of my telescopic chute in the retracted or fully nested position illustrating the generally flush alignment of the ends of the chute sections when fully nested.

The attachment structure for telescopic connection of chute sections 14 consists of removable support tracks 42 and guide rails 44, forming a system of interlocking mortise and tendon type joints, similar in appearance to a slidable dovetail joint. Each support track 42 is made up of two narrow elongated trapezoidal metal bars affixed parallel to one another onto the interior surface of chute sidewalls 19, forming a space therebetween for slidably housing guide rail 44. Guide rail 44 and support tracks 42 contain a series of bolt apertures 46 for removable connection to chute sections 14 with bolts, rivets or machine screws. Bolt apertures 46 could be threaded or non-threaded depending on the type of fastener used. I prefer bolts into threaded apertures for these removably attached parts. Guide rails 44 are affixed one to each exterior surface of chute sidewalls 19 of support chute 30 and both mid-section chutes 38 aligned with support tracks 42 affixed to the interior surface of chute sidewalls 19 of dispensing chute 40 and both mid-section chutes 38. This allows the telescopic connection of all chute sections 14 into one main assembled chute 10. The graduated size differential of each chute section 14 allows for this telescopic nested position as shown in FIG. 6, with the discharge end 27 and scrapers 26 of all chute sections 14 aligned flush at the distal end when chute 10 is in the contracted or fully nested position, as shown in FIG. 7 and 9.

Powering for telescopic extension and contraction of chute sections 14 is provided by three hydraulic rams in the example of the invention shown in the drawing FIGS. 2 and 3. First ram 50 in FIG. 2 is affixed at one end thereof to the exterior back end 29 of sidewall 19 of support chute 30, with the opposite end of ram 50 affixed to back end 29 of the adjacent mid-section chute 38. Actuation of first ram 50 extends both mid-section chutes 38, along with dispensing chute 40, approximately the length of one chute section 14. Second ram 52 shown in FIG. 3 is affixed at one end thereof to the back end 29 of the mid-section chute 38 adjacent support chute 30, with the second attachment being made to the exterior back end 29 of the second mid-section chute 38 which is adjacent dispensing chute 40. Actuation of second ram 52 extends the second mid-section chute 38 and dispensing chute 40. Third ram 53 also shown in FIG. 3 is affixed at one end thereof to exterior back end 29 of the second mid-section chute 38 with the second attachment made to back end 29 of dispensing chute 40. Actuation of third ram 53 extends dispensing chute 40, completing the full extension of chute 10. All three rams, 50, 52, are 53 are simultaneously actuated with one switch, although it could be easily arranged with switching to control the rams separately. Also, currently, the maximum extension of hydraulic rams 50, 52, and 53 is the limiting factor for the maximum outward extension of chute sections 14 relative to each other. The maximum extension of the rams prohibits the over extension and separation of the chute sections 14. Other methods could of course be used to prohibit over extension and separation of chute sections 14.

Figure 8:
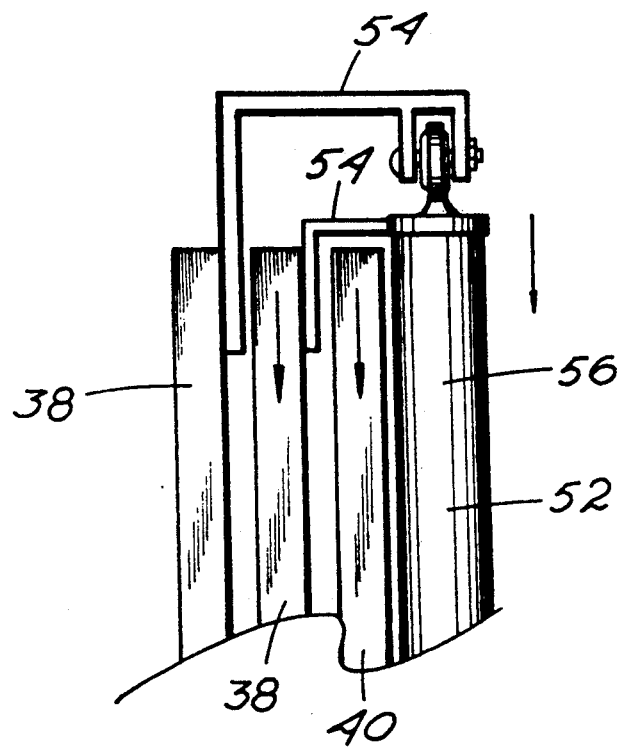
FIG. 8 partially illustrates the top right outside edges of three chute sections retracted together, and having brackets attached to two chute sections. The brackets are used for clearance purposes to extend to the outside of the chutes to attach one bracket to the housing of a hydraulic ram, and the second bracket to the slidable arm of the hydraulic ram used to retract and extend the chute sections.

Ram attachment brackets 54 are illustrated in FIG. 8 as one suitable structuring of providing sufficient clearance for attachment of rams 48 to chute sections 14 when in the fully nested position Illustrated in FIG. 8 are the exterior top right edges of chute sidewalls 19 of first mid-section chute 38 on the left, the second mid-section chute 38, in the middle left, and dispensing chute 40 middle right. The upper ram attachment bracket 54 is shown as an L-shaped bracket affixed to the first mid-section chute 38 on the left, with the opposite end removably affixed to one end of second ram 52. The second smaller ram attachment bracket 54 is affixed to the second mid-section chute 38, marked with a movement arrow, with the other end affixed to the adjacent rim of the hydraulic cylinder housing 56 of second ram 52. The opposite end of hydraulic cylinder housing 56, not shown in this view, is left un-affixed, allowing for clearance of dispensing chute 40. Other attachment structures of hydraulic rams 48 are also possible, with this particular method illustrated for example only. All of hydraulic rams are powered by hydraulic pump 60, located on, and common to all mixer trucks 12, see FIG. 1. Hydraulic lines 58 are routed through solenoid valves 61, shown in FIG. 9, from hydraulic pump 60 to all hydraulic rams 48.

Chute 10 is pivotally affixed by support chute 30 to the back end of mixer truck 12, best shown in FIGS. 2 and 3. The bottom surface of back end 29 of support chute 30 is affixed with a horizontal pivot pin 62 which is rotatably affixed to the upper end of vertical axle 64, located in a stationary mounting block 66. Mounting block 66 is attached to the rear of transit concrete mixer 12. Vertical axle 64 extends downward past the bottom surface of mounting block 66 where it is connected to ram 48. The opposite end of ram 48 is affixed to the distal end of support brackets 32 of support chute 30. Each end of ram 48 is of course pivotally attached to allow the ram 48 to change angles relative to the attach point.

Vertical axle 64 is affixed with gear 68 on the interior of mounting block 66, where rotation is provided by hydraulic or electric motor 70. Actuation of chute motor 70 causes rotation of chute 10 with vertical axle 64. Vertical pivotal motion of chute 10 about a horizontal axis is accomplished by rotation of support chute 30 on pivot pin 62 with the extension and retraction of ram 48. The discharge end 27 of chute 10, when extended, is raised when ram 48 is extended, and lowered when ram 48 is contracted, as shown in the dotted outline of FIG. 3.

Figure 5:
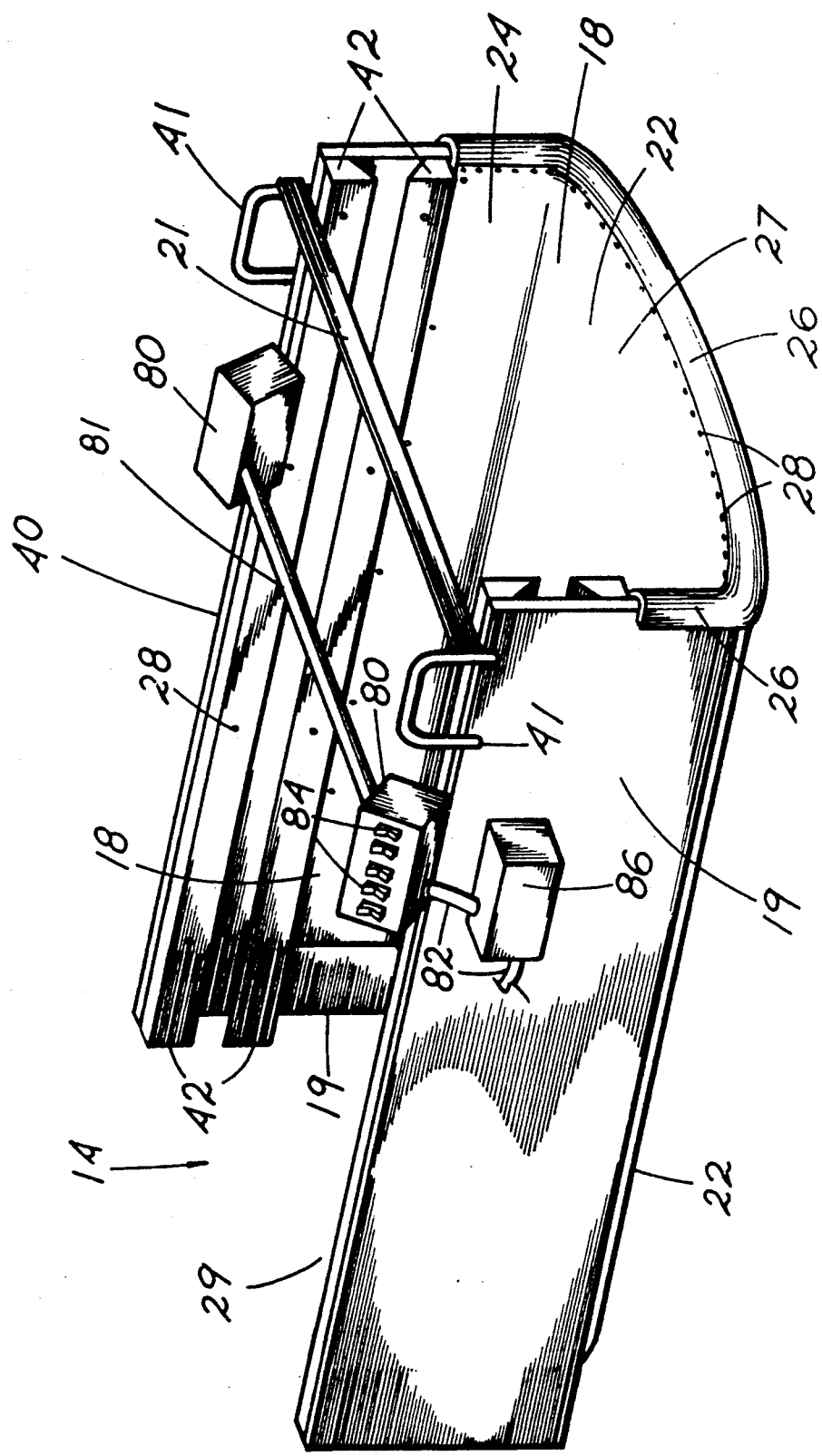
FIG. 5 is a view of one assembled chute section. The chute section shown in this view is the outer most or last section away from the truck and does not have the dovetail shaped guide rail affixed to the exterior as does the section shown in FIG. 4. This section is shown with a switch control station on each side of the chute to allow controlled movement by a person from either side of the distal end of the chute. Loop handles are also shown to allow the chute to be manually moved laterally if necessary. Manual movement may be necessary to finish a job in the rare event of an equipment failure in the field, or my chute may be built without any powering motor to move the chute about a vertical axis as is the normal case with most hook-together chutes where the operator at the dispensing end of the chute simply pulls and pushes the chute about a pivotal vertical axis.

Remote controls 80, best shown in FIG. 5 and 6, are affixed to the discharge end 27 of dispensing chute 40, powered via a multiple conductor electrical line 82 and utilized to control various functions of chute 10 including solenoid valves which control rams 48, 50, 52, 53, and motor 70. Electrical line 82 is preferably spooled onto a dispensing and spring-return cable reel 83 as shown in FIG. 9 attached to truck 12. Cable reel 83 maintains the cable 82 out of the way regardless of the position of chute 10. In FIG. 6, two remote control switch stations 80 are shown, one on each side of the chute section. An electrical cross-over conduit 81 is shown connecting the remote switch stations 80 together, with each remote switch station 80 having identical switches wired in parallel to allow control of certain functions of chute 10 and truck 12 from either side. Each remote control switch station 80 preferably contains five separate rocker switches 84 for controlling various functions. One rocker switch 84 controls right and left horizontal movement, with a second switch controlling up and down vertical movement of chute 10. A third rocker switch 84 controls extension and contraction of chute 10. A fourth rocker switch 84 is preferably arranged to control rotation of drum 88 of transit mixer truck 12 to allow the operator to control the dispensing of concrete from the drum 88, being able to dispense with the drum rotating in one direction, and in a rotating but non-dispensing mode when rotating in an opposite direction. The fifth rocker switch is for operating vibrator 86 and a chute movement safety alert-horn if desired. The alert horn is not shown in the drawings. Electric vibrator 86 is shown affixed to dispensing chute 40 in FIG. 5, directly below remote controls 80. Vibrator 86 could be hydraulically powered, but since a multiple conductor electric cable 82 is already in the area, it is simplest to use an electrically powered vibrator 86. The electricity for powering vibrator 86 and the electric solenoid valves 61 is obtained from the electrical system of truck 12. The engine of truck 12 is always running while concrete is being hauled or unloaded. Each rocker switch 84 is safety oriented as the movement or action it controls is accomplished only so long as the right or left area of each switch 84 is manually depressed by the operator, in other words, momentary contacts are used in the switches.

In use, the rear or dispensing end of mixer truck 12 is positioned as near as possible to the concrete forms into which the cement is to be poured. The engine of transit concrete mixer 12 is left running to operate the various motors and hydraulic components of both the truck 12 and chute 10. The worker then manipulates remote controls 80 located at the discharge end 27 of chute 10, and either completely or partially extends chute 10 to the desired length, while also adjusting height and horizontal position. Once discharge end 27 of chute 10 is properly located, the operator changes the direction of drum 88 rotation, with use of remote controls 80, to begin dispensing the concrete or other material from discharge opening 90 of drum 88. Vanes located on the interior of drum 88 direct the concrete to flow upward and out the discharge opening 90 of drum 88 when rotated clockwise, where it is directed into receiver funnel 36 of support chute 30. Receiver funnel 36 helps to direct and contain the cement as it passes into chute 10. Once the cement is directed into chute 10, it flows downward towards discharge end 27. Should the angle of chute 10 be insufficient for the cement to flow easily, vibrator 86 can be activated by the worker from remote controls 80. Vibrator 86 creates a moderate tremor throughout chute 10, thus assisting in moving the cement downward.

Again, one of the main features of this invention includes removable plastic liners 18 and plastic scrapers 26. The natural abrasive characteristic of the cement creates heavy wear and tear even on metal surfaces. Since conventional metal chutes have a generally short life expectancy, this becomes an expensive and time consuming problem. Plastic liners 18 are manufactured of a slick, non-abrasive durable plastic which resists abrasion from the concrete, and actually surpasses metal in durability in this application. Scrapers 26 are also comprised of the same material as liners 18 and function as a wiper, removing excess concrete when chute 10 is retracted into the nested or storage position. Each scraper 26 wipes the surface of bottom panel 22 of liner 18 of the forward adjacent chute section 14 as chute 10 is retracted into the storage position. After retraction, chute 10 is then extended out again and hosed down with water for a final cleaning. Plastic liners 18 and scrapers 26 also resist adhesion of dried concrete and clean very easily with water. This saves the concrete workers a great deal of time in clean-up. Rust and corrosion is also eliminated with plastic liners 18. When liners 18 do become damaged or worn, they can be removed separately from chute frame 16 and replaced, thus saving the expense of replacing the entire chute section 14. Support tracks 42 and guide rails 44 are also removable, and can be easily replaced when worn. The individual replacement features of separate sections of chute 10 which receive heavy wear, help to reduce costs by reducing down time in major repairs or replacement of entire chutes 10.

Although a preferred embodiment has been described and shown in the drawings sufficiently to allow those skilled in the art to both build and use my improved telescopic chute, it is to be understood that various modifications may and probably will be practiced in the device, and that these modifications may be made without departing from the spirit of the appended claims.

What I claim as my invention is:

1. A telescopic chute mounted on a mixer truck, said telescopic chute comprising:

an assemblage of at least two elongated open ended and open bottom chute frames generally fully nested together with the open ends of said chute frames generally aligned, said chute frames slidably affixed one said chute frame to another said chute frame to provide means for shortening and lengthening the telescopic chute by way of sliding;

powered means affixed to at least one said chute frame for actuating inward and outward sliding of said chute frames between said generally fully nested and a partially nested position;

at least one removable liner affixed to each said chute frame providing a replaceable surface for flowable material moving through said telescopic chute to flow against;

chute attachment means affixing the assemblage of lined chute frames to said mixer truck to receive dispensed flowable material from a drum of said mixer truck, said chute attachment means including pivotal structuring to allow rotational movement of the assemblage of lined chute frames about a vertical axis, said chute attachment means further including pivotal structuring to allow rotational movement of the assemblage of lined chute frames about a horizontal axis, powered means for actuating the assemblage of lined chute frames about said horizontal axis;

manually actuatable control means adapted for actuating said powered means for actuating said rotation of the assemblage of lined chute frames about said horizontal axis, said control means further adapted for actuating said powered means for actuating said inward and outward sliding of said chute frames.

2. A telescopic chute according to claim 1 wherein said removable liners are manufactured having at least a plastic material surface on which flowable materials flowing through said telescopic chute flow against.

3. A telescopic chute according to claim 2 wherein said removable liners are affixed with threadably engaged means to said chute frames.

4. A telescopic chute according to claim 1 wherein said chute frames are manufactured of metal.

5. A telescopic chute according to claim 1 wherein said powered means adapted for powering the assemblage of chute frames about said horizontal axis includes a hydraulic ram.

6. A telescopic chute according to claim 1 wherein said powered means affixed to at least one said chute frame to provide inward and outward sliding of said chute frames includes at least one hydraulic ram.

7. A telescopic chute according to claim 1 wherein said control means further includes remote switching means positioned to provide means for an operator of said control means to manipulate movement in said telescopic chute while standing closely adjacent a dispensing end of said telescope chute with said telescopic chute in a lengthened condition.

8. A telescopic chute according to claim 1 further including powered means for actuating the assemblage of lined chute frames about said vertical axis, with the powered means actuatable with said control means with said remote switching means.

9. A telescopic chute according to claim 1 further including a vibrating means to aid in causing said flowable material to flow through said telescopic chute.

10. A telescopic chute mounted on a mixer truck, said telescopic chute comprising:

an assemblage of at least two elongated open ended chute sections generally fully nested together with the open ends of said chute sections generally aligned, said chute sections slidably affixed one said chute section to another said chute section to provide means for shortening and lengthening the telescopic chute;

powered means affixed to at least one said chute section for actuating inward and outward sliding of said chute sections relative to each other;

chute attachment means affixing the assemblage of chute sections to the mixer truck to receive dispensed flowable material from a drum of the mixer truck, said chute attachment means including pivotal structuring to allow rotational movement of the assemblage of chute sections about a vertical axis, said chute attachment means further including pivotal structuring to allow rotational movement of the assemblage of chute sections about a horizontal axis;

powered means for actuating the assemblage of chute sections about said horizontal axis;

manually actuatable control means adapted for actuating said powered means for actuating said rotation of the assemblage of chute sections about said horizontal axis, said control means further adapted for actuating said powered means for actuating sliding of said chute sections relative to each other, said control means further including remote switching means positioned to provide means for an operator of said control means to manipulate movement in said telescopic chute while standing closely adjacent a dispensing end of said telescopic chute with said telescopic chute in a lengthened condition.

11. A telescopic chute according to claim 10 wherein said chute sections are comprised of open metal frames having removably attached liners, with said liners providing a surface for flowable material to flow against.

12. A telescopic chute according to claim 11 further including powered means for actuating the assemblage of chute sections about said vertical axis, said powered means adapted to be actuated in response to said control means and said remote switching means.

13. A telescopic chute according to claim 12 wherein said metal frames are slidably affixed together with means including removably attached guide and support tracks.

14. A telescopic chute according to claim 12 wherein said guide and support tracks are affixed to said metal frames by means including threadably engaged fasteners.

15. A telescopic chute mounted on a mixer truck, said telescopic chute comprising:

an assemblage of at least two elongated open ended and open bottom chute frames generally fully nested together with the open ends of said chute frames generally aligned, said chute frames slidably affixed one said chute frame to another said chute frame by way of removably attached guide and support tracks to provide means for shortening and lengthening the telescopic chute;

powered means affixed to at least one said chute frame for actuating inward and outward sliding of said chute frames between said generally fully nested and a partially nested position;

at least one removable liner affixed to each said chute frame providing a replaceable surface for flowable material moving through said telescopic chute to flow against;

chute attachment means affixing the assemblage of lined chute frames to said mixer truck to receive dispensed flowable material from a drum of said mixer truck, said chute attachment means including pivotal structuring to allow rotational movement of the assemblage of lined chute frames about a vertical axis, powered means for actuating the assemblage of lined chute frames about said vertical axis; said chute attachment means further including pivotal structuring to allow rotational movement of the assemblage of lined chute frames about a horizontal axis, powered means for actuating the assemblage of lined chute frames about said horizontal axis;

manually actuatable control means adapted for actuating said powered means for actuating said rotation of the assemblage of lined chute frames about said horizontal axis, said control means further adapted for actuating said powered means for actuating said rotation of the assemblage of lined chute frames about said vertical axis, said control means further adapted for actuating said powered means for actuating said inward and outward sliding of said chute frames, said control means further including remote switching means positioned to provide means for an operator of said control means to manipulate movement in said telescopic chute while standing closely adjacent a dispensing end of said telescopic chute with said telescopic chute in a lengthened condition.

* * * * *